Jan. 5, 1954
J. M. TORR
2,664,938
PLASTIC BONDING MACHINE
Filed Nov. 29, 1952
3 Sheets-Sheet 1
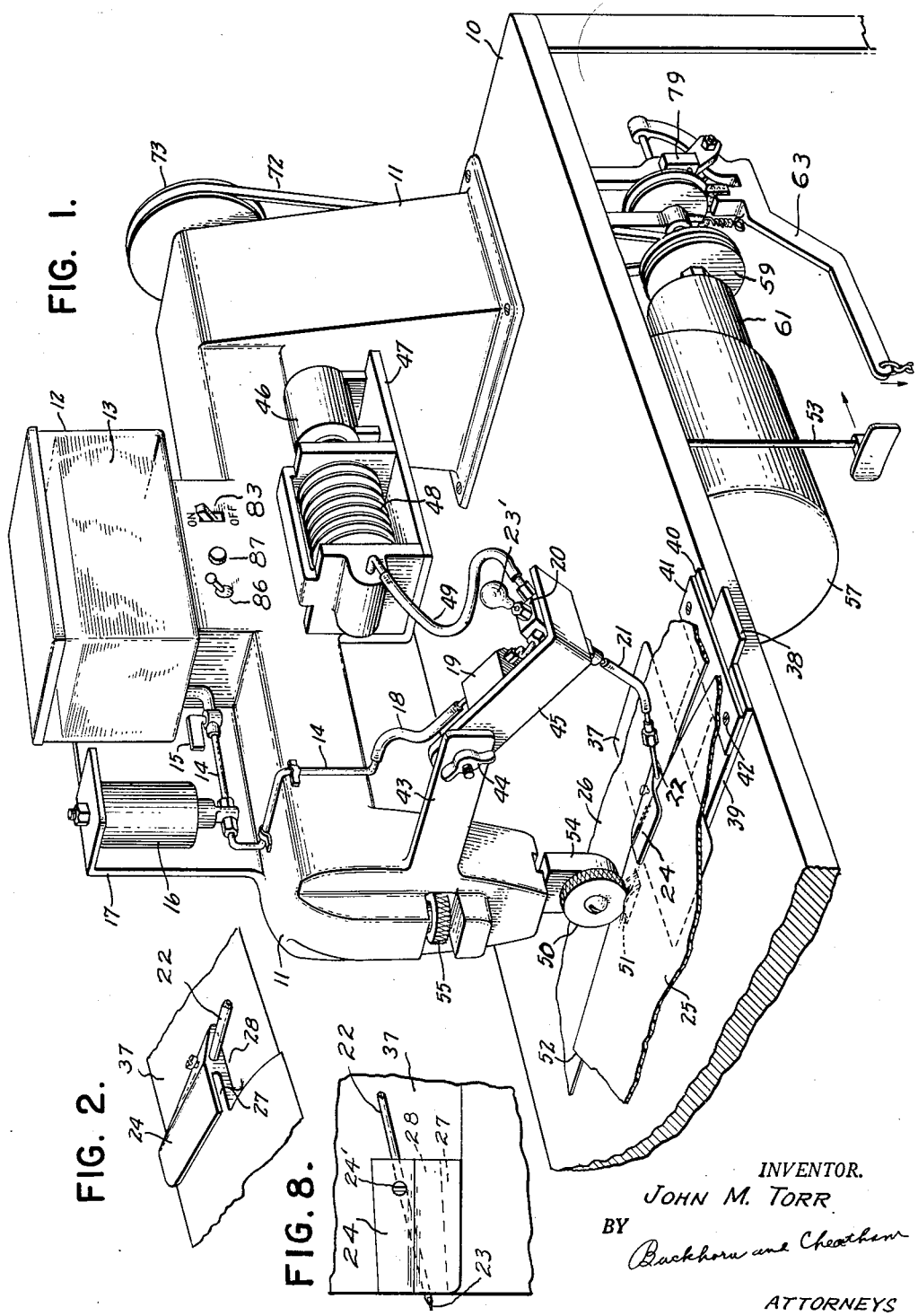
INVENTOR.
JOHN M. TORR
BY
Buckhorn and Cheatham
ATTORNEYS

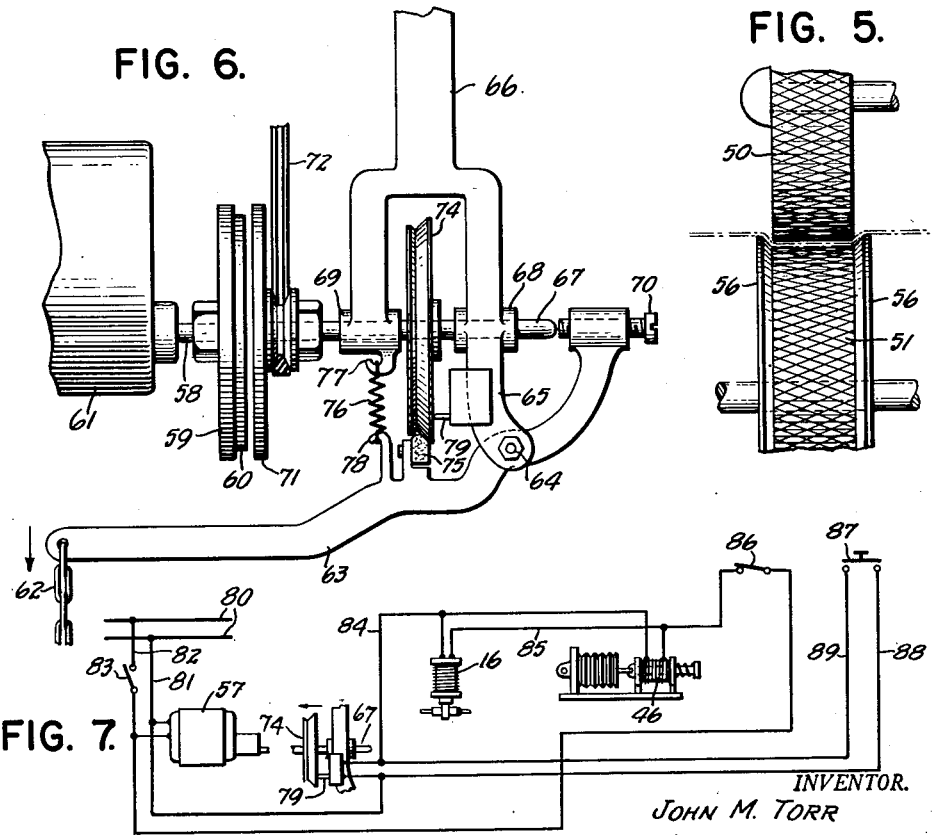

Jan. 5, 1954  J. M. TORR  2,664,938
PLASTIC BONDING MACHINE
Filed Nov. 29, 1952  3 Sheets-Sheet 3
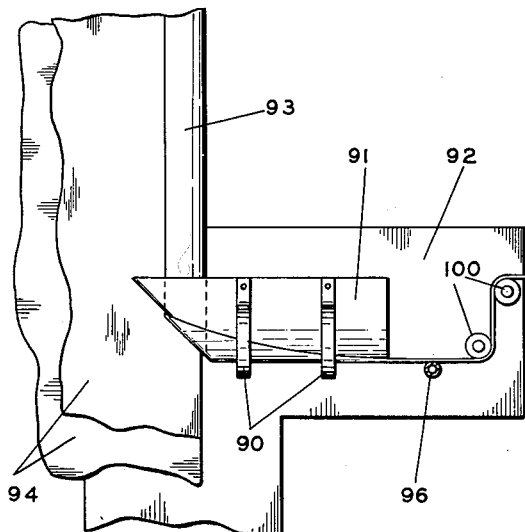
Fig. 9
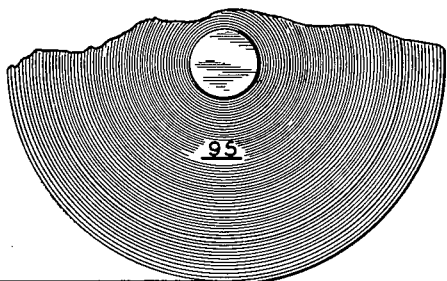
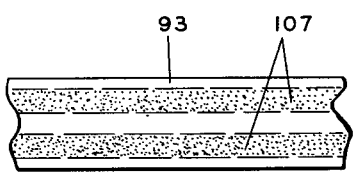
Fig. 13
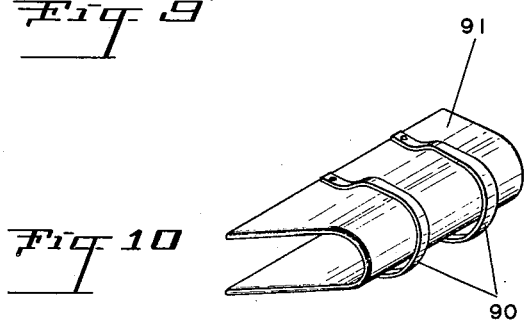
Fig. 10
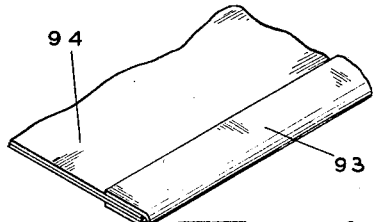
Fig. 14
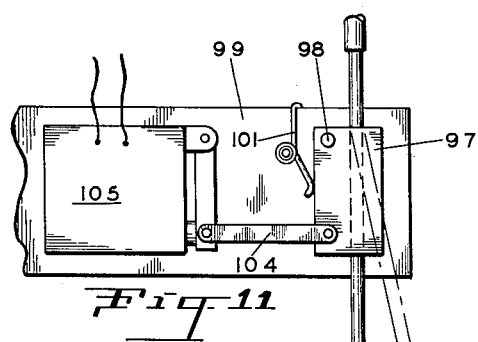
Fig. 11
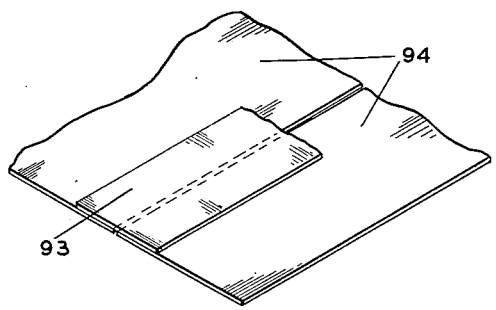
Fig. 15
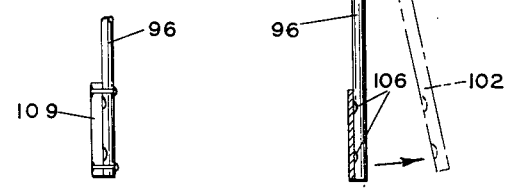
Fig. 12
INVENTOR.
JOHN M. TORR
BY
Buckhorn and Cheatham
ATTORNEYS Patented Jan. 5, 1954

2,664,938

UNITED STATES PATENT OFFICE 2,664,938

PLASTIC BONDING MACHINE

John M. Torr, New York, N. Y., assignor to Phillips Screw Company, a corporation of Delaware Application November 29, 1952, Serial No. 323,242

12 Claims. (Cl. 154—42)

1

The present invention relates to apparatus for bonding or sealing pieces of plastic together and, while it is not limited thereto, the apparatus is particularly suitable for permanently bonding together sheets of vinyl resin.

It has been proposed heretofore to join sheets of plastic material together by placing a bond-effecting liquid between overlapped sheet portions which are thereafter pressed together, but difficulty has been encountered in the operation of machines for performing this operation primarily because no satisfactory arrangement has heretofore been devised for controlling the feeding of the liquid between the sheets, particularly in regard to starting and stopping the flow at desired times. It is of essential importance that liquid be delivered to the sheets at the precise instant that the machine is started for if the liquid flow is delayed momentarily, a faulty seam is produced. It is equally important that the liquid flow be stopped instantaneously with the stopping of the machine, for if the feeding nozzle should continue to drip after the machine is stopped, the liquid, which is highly solvent, might smear across a face of one of the sheets and ruin the same.

The primary object of the present invention is to provide a new and improved apparatus for producing a permanent bond between two pieces of plastic sheet.

More particularly, it is an object of the invention to provide a machine of the class described including new and improved means for controlling the delivery of bond-effecting liquid.

A specific object of the invention is to provide a machine of the class described including a new and improved solvent delivery system for starting and stopping the delivery of solvent to plastic sheets being bonded together simultaneously with the starting and stopping of the machine.

A still further object is to provide means for readily clearing the liquid delivery nozzle in the event that the same becomes clogged with solidified bonding liquid.

Another object of the invention is to provide a new and improved element for guiding the edge portions of plastic sheets into overlapping relation and for supporting a solvent delivery nozzle in position between the overlapped portions.

Other objects and advantages will become more apparent hereinafter.

In accordance with the illustrated embodiment, the machine of the present invention includes a pair of rollers adapted to press together the overlapped portion of plastic sheets and to draw the sheets through the machine. Mounted

2 in front of the rollers is a guide element adapted to guide the sheets into overlapping relation, in which element is mounted a nozzle to feed a bond-effecting liquid between the overlapped portions of the sheets as they emerge from the guide element. The bond-effecting liquid is fed to the nozzle through a suitable delivery system to which is connected a pressure device operable upon starting of the machine to create a pressure pulse to positively initiate flow of the bond-effecting liquid, and operable upon stopping of the machine to create a suction upon the liquid to positively and simultaneously withdraw the same from the tip of the nozzle and thus prevent dripping.

For a more complete description of the invention, reference is made to the following specification taken in conjunction with the accompanying drawings wherein:

Fig. 1 is a perspective view of the machine of the present invention;

Fig. 2 is a perspective view showing one form of a guide element for guiding sheets into overlapping relation;

Fig. 3 is a cross-sectional view of another form of guide element for guiding sheets into overlapping relation;

Fig. 4 is a vertical cross-sectional view showing the arrangement of the pressure rollers, the guide element of Fig. 2, and a portion of the solvent delivery system;

Fig. 5 is a front elevation of the rollers;

Fig. 6 is an enlarged side elevation of a portion of the driving mechanism of the machine;

Fig. 7 is a schematic line diagram of the electrical control system for the machine;

Fig. 8 is a top plan view of the guide element of Fig. 2;

Fig. 9 is a fragmentary plan view illustrating a further modification of a tape guiding means;

Fig. 10 is a view in perspective of one detail incorporated in Fig. 9;

Fig. 11 is a fragmentary side elevation illustrating a further modification of a bonding liquid applicator;

Fig. 12 is a fragmentary side elevation showing an alternative construction for one detail of Fig. 11;

Fig. 13 is a plan view showing a strip of tape with bonding liquid applied thereto;

Fig. 14 is a fragmentary view in perspective showing a strip of tape applied over the edge portions of a pair of sheets of plastic material; and Fig. 15 is a fragmentary view showing the pair of sheets of Fig. 14 in the unfolded condition.

The machine of the present invention is designed particularly for the fabrication of various articles from thin sheets of plastic material. While it is suited for applying a liquid bond-effecting medium of any type to a pair of sheets of any material, the machine is particularly adapted for applying a bond-effecting liquid that comprises a solvent for the plastic material being bonded. The choice of such solvent is dependent, of course, upon the type of plastic being united and forms no part of the present invention except that in any instance it should be a highly volatile, fast-acting material. By way of example, the machine of this invention has operated successfully in uniting sheets of vinyl resin utilizing tetrahydrofuran as the solvent. Another bonding material that has proved very satisfactory is one obtained by dissolving in the solvent small quantities, up to 10% by weight, of some of the solids, e. g., vinyl copolymer resins, which make up the plastic material to be bonded.

In general constructional outlines and operation, the machine which is the subject of the present invention resembles a conventional sewing machine and has a table 10 supporting a frame 11. A reservoir 12 mounted on frame 11 is adapted to be filled with bond-effecting liquid 13, such as of the type described. A conduit system 14 for the solvent is connected to reservoir 12 and has a manually operable spigot 15 which is normally left open, except when shutting down the machine for any length of time. A solenoid operated shut-off valve 16 in conduit 14 is supported from a bracket 17 upstanding from frame 11. Solvent 13 will flow by gravity to shut-off valve 16, which is closed except when the solenoid is energized during operation of the machine. Portion 18 of conduit 14 is preferably, though not necessarily, made of any suitable flexible tubing and connects with a conventional adjustable metering or needle valve diagrammatically illustrated at 19. Valve 19 may be set to permit solvent to flow through the conduit system at a predetermined desired rate to a junction point or T-fitting 20, which is connected by another length of flexible tubing 21 to a nozzle 22. I have found that a hypodermic needle like that used by physicians is satisfactory as an outlet or discharge nozzle for the solvent delivery system. The amount of solvent to be discharged from the end of nozzle 22 should not be more than at a constant drip rate and this may be regulated by valve 19 as previously mentioned. As shown more clearly in Fig. 4, a solid member or wire 23 extends from the T-fitting 20 through the conduit system to open end 22' of nozzle 22. Wire 23 has a handle 23' attached to it by means of which it may be manually moved back and forth to clean out any foreign matter that may have gotten into the conduit and, particularly, to keep opening 22' clear. Sometimes when a machine has not been operated for a while the conduit may become clogged due to evaporation and solidification of the bond-effecting liquid. The diameter of the wire 23 is much smaller than the opening through the nozzle 22 and is left in the position shown in Fig. 4 during use of the machine. Prior to starting the machine, the wire is pulled back through the muzzle and then pushed forwardly again whereupon enough liquid solvent is carried by the wire into the nozzle to dissolve a free flowing passageway through any deposit which may have formed during a previous period of idleness of the machine. The nozzle is readily and quickly removable by reason of the flexible connection 21 thereto in the event that it is desired to replace the same with another, or to effect a more thorough cleaning thereof.

Nozzle 22 extends through a work piece guide unit 24 and is held therein by means of setscrew 24'. Unit 24 is adapted to guide plastic sheets 25, 26 into overlapping relationship by means of slots 27, 28. As best seen in Fig. 4, solvent is delivered from end 22' of the nozzle between the overlapped sheets at a uniting station just prior to their entry between two rollers, to be later described, which press them together. Guide unit 24 is removable and other guide units may be substituted depending on the type of work which it is desired that the machine perform. While the general construction of these guide units resembles feeding attachments for sewing machines, it is a feature of the present invention to provide such a device with one or more nozzles for delivering solvent to perform seaming operations upon plastic sheets. Referring to Fig. 3, a guide unit is shown suitable for forming a hem on a sheet 29 of plastic material by bonding a length of plastic tape 30 along one edge of sheet 29. A tape guide 31 feeds tape 30 in U-shaped relationship around the edge of sheet 29 while nozzle 32 feeds solvent between the upper surface of sheet 29 and tape 30, and nozzle 33, positioned substantially in vertical alignment with nozzle 32, feeds solvent between the lower surface of the plastic sheet and tape. Just as in the case of the single nozzle guide unit, pressure rollers immediately press the tape and sheet together as they come out of the guide unit.

The mounting for guide unit 24 is a T-shaped structure comprising cross plate 37 and stem plate 38. Plate 38 is movable within a channel formed between two side plates 39, 40 mounted on table 10. Another cross plate 41 extends between plates 39, 40 and by means of screws 42 may be tightened to clamp plate 38 in the desired position.

An arm 43 extends from frame 11 and has secured thereto by means of a bolt and wing nut assembly 44 a bracket support 45 for mounting the lower portion of conduit system 14 and parts connected thereto. Support 45 is movable through an arc to different positions depending on the table attachments or guide units employed.

A combined air pressure and suction device comprising a solenoid operated bellows arrangement 46 is suitably mounted on a platform 47 extending from frame 11. Bellows 48 is connected by a flexible tube 49 to conduit system 14 at the T-connection 20.

A pair of vertically disposed, rotatable, knurled rollers 50, 51 in the plastic sheet uniting station are mounted in line with guide unit 24 so as to engage the overlapped portions of the plastic sheets and press them together. A permanent seal or bond 52 is immediately produced because the highly volatile solvent will have completely evaporated as soon as the softened surfaces of the sheets are pressed together.

A lever arrangement 53 extends beneath table 10 and may be conveniently operated by the machine operator's knee in the direction indicated by the arrow (Fig. 1) to raise roller 50 via its supporting piece 54 and permit insertion and adjustment of overlapped sheets 25, 26 between the rollers. The connections between elements 53 and 54 for raising and lowering the roller are not shown since they form no part of the invention and may be any suitable mechanical arrangement. A nut 55 mounted in frame 11 is adjustable to vary the pressure between the rollers in a well-known manner.

Referring to Fig. 5, it will be seen that lower roller 51 has raised side flanges 56. The purpose of the flanges is to form a channel for confining the solvent when the moistened plastic sheets are pressed together by the rollers so that any excess liquid will be kept within the desired bonding area.

A motor 57 mounted beneath table 10 drives a shaft 58 (Fig. 6) on which a disc 59 having a facing 60 of leather or the like is mounted. Suitable gear reduction mechanism 61 is connected between shaft 58 and motor 57. A clutch mechanism operable by a foot treadle (not shown) may be actuated to start solvent flowing and to initiate rotation of rollers 50, 51. A chain 62 is connected at one end to the treadle and at the other end to a lever 63 pivotally mounted at 64 on a leg 65 of a fork 66 fastened to table 10 and supporting shaft 67 in bearings 68, 69. An adjustable screw 70 is mounted at the free end of lever 63 adapted to engage the end of shaft 67 and cause axial movement thereof. When lever 63 is moved down in the direction indicated by the arrow, the shaft 67 is moved to the left, as viewed in Fig. 6; and disc 71 mounted on the opposite end of shaft 67 is moved into contact with the face 60 of rotating disc 59 whereupon shaft 67 starts to rotate. Disc 71 drives a belt 72 which in turn drives a wheel 73 (see Fig. 1) which, by suitable gear trains and connections, connects rollers 50, 51 into driving relationship with belt 72.

A braking arrangement is provided in order to stop rotation of shaft 67 as soon as the operator releases his foot from the treadle. A wheel 74, having a V-shaped rim, is mounted tight on shaft 67. A brake 75 of leather or the like, is mounted on lever 63 and is urged into contact with the rim of wheel 74 by means of a relatively heavy spring 76 connected between hooks 77, 78 respectively on the housing of bearing 69 and lever 63. When lever 63 is pivoted about point 64 against the pressure of spring 76, brake 75 is moved down out of contact with wheel 74. Simultaneously with release of the brake, driving engagement is effected between discs 59 and 71. As soon as lever 63 is released, brake 75 is brought into contact with wheel 74 immediately to stop rotation of shaft 67. A switch device 79 is mounted on leg 65 and is normally held open by pressure from a side of wheel 74. As soon as wheel 74 is moved to the left, the operating stem of the switch device is disengaged permitting the contacts of the switch to close for causing energization of the solenoids 16 and 46.

Referring to Fig. 7, motor 57 is fed from power mains 80 over conductors 81, 82 in which is connected a manually operable switch 83. When shaft 67 is moved to the left, wheel 74 is moved away from switch 79, permitting it to close a circuit for solenoid operated shut-off valve 16 and solenoid 46 of the bellows device which are connected in parallel. The circuit may be traced from one of the supply lines 80, conductor 81, switch 79, conductor 84, solenoid of valve 16 and solenoid 46, conductor 85, a normally closed switch 86, and conductor 82 back to the other side of the source of supply 80. If for any reason it is desired to leave motor 57 running but prevent the solenoids from becoming energized, manual switch 86 is opened. A manual push button switch 87 is connected by conductors 88 and 89 around the contacts of switch 79 whereby the solenoids 16 and 46 may be energized independently of operation of lever 63. This may be desired when flushing out the bonding liquid delivery system. Switches 83, 86 and 87 may for convenience be mounted on the frame 11 as shown in Fig. 1.

Assuming that conduit system 14 is full of solvent and that plastic sheets 25, 26 are inserted in overlapping relationship in the guide unit 24, the operation of the machine is as follows:

Switch 83 is put in "on" position, permitting energization of motor 57. The operator steps down on the treadle, moving shaft 67 to the left, permitting energization of the solenoids of valve 16 and bellows 48. Thereupon valve 16 is opened and bellows 48 compressed. The latter injects a pulse of air into the conduit system through tube 49, insuring that solvent will commence to flow immediately from end 22' of the nozzle. Rollers 50, 51 are rotating and, as the moistened overlapped sheets of plastic material are fed to them, they press the sheets together, causing them to be bonded together. As the operator releases pressure on the treadle, shaft 67 moves back to the right, and wheel 74 opens switch 79, de-energizing solenoids 16 and 46. At the same time, brake 75 is applied to wheel 74, stopping the rollers. The de-energizing of the solenoids closes the main shut-off valve 16 and permits expansion of bellows 48. The expansion of the bellows causes suction in the conduit system, stopping any flow of solvent from end 22' of the nozzle, and sucking back into the nozzle any drops which may have formed on the end of the nozzle. In order to maintain complete control over the bonding process, it is important that no solvent be applied to the plastic sheets unless it is desired to bond them together. The degree of movement required of bellows 48 to cause a pressure pulse upon the liquid in the delivery system to initiate flow from the nozzle need not be very great. Also, the amount of suction necessary to withdraw liquid back up into the nozzle upon stopping of the machine is also very small due to the small size of the bore through the elongated nozzle. While a bellows device has been shown for producing the pressure pulse and suction upon the liquid delivery system, similar results may be accomplished by other well-known means which may be substituted for the bellows device.

It is an important feature of the invention that the discharge of solvent onto the plastic sheets will be simultaneous with the operation of the machine. When the machine starts, a pulse from the bellows starts the flow of solvent; and when the machine stops, suction from the bellows immediately stops any solvent flow.

In Fig. 3, described above, is illustrated a device for applying a tape over an edge of a single sheet of material for reinforcement purposes. In Fig. 9 is illustrated a further modification of such a device which is particularly adapted and suitable for bonding together two sheets of material in a manner illustrated more clearly in the views of Figs. 12, 13 and 14. The guide device 91, as shown in this instance, may be suitably mounted such as upon a T-shaped member 92 similar to the member 37, 38 as previously described. The device 91 will be recognized as a well-known type of bias tape feeder as used on sewing machines consisting of an elongated element having a convexly curved outer surface and an angularly cut end portion adapted for folding the tape 93 into a U-shape as shown in Fig. 13 about the aligned edge portions of the sheets 94. The tape 93 is fed from supply roll 95 toward the folding device 91 between idler rollers 100 in a flatwise condition, and bond-effecting liquid is applied to the surface of the tape 93 through the liquid conducting nozzle 96 which is more fully illustrated in the view of Fig. 11. It will be observed that the tape will slide over the convexly curved guide element 91 with the liquid coated surface facing outwardly. The guard loops 90 are provided upon the device 91 in a spaced relation from the outer surface of the tape so as not to wipe the bonding liquid from the tape surface. The guide rolls 100 serve to flatten the type and to hold it in a predetermined position for engagement by the nozzle 96 and also to control tension of the tape, it being understood that the tape is pulled with the sheets 94 through the machine by the pressure rollers 50, 51 as previously described.

Referring to Fig. 11, the bond-effecting liquid nozzle 96 is mounted in a supporting member 97 which, in turn, is pivotally mounted as at 98 upon the end portion of a bracket arm 99 which may, for example, be a portion of the bracket arm 45 as previously described. The supporting member 97 for the nozzle 96 is normally biased by means of a suitably arranged spring 101 mounted upon the bracket arm 99 to an inoperative position indicated by dotted lines 102 in which the lower end of the nozzle 96 is moved relatively away from the tape 93. The nozzle supporting member 97 is operatively connected such as through the link 104 to an electromagnet device indicated generally at 105, the winding of which may be connected in the electric circuit shown in Fig. 7 in parallel relation with the windings 16 and 46 whereby upon energization of these latter devices the nozzle 96 will simultaneously be actuated from the inoperative or dotted line position to the operative or full line position as shown. A pair of relatively small openings indicated at 106 are provided in the side wall of the nozzle 96 facing the tape 93 so that as the tape 93 is drawn past such openings, bond-effecting liquid will spread thereby over the surface of the tape in the manner illustrated in Fig. 13. In this figure a strip of tape 93 is shown having two spaced apart surface portions indicated at 107 coated with bond-effecting liquid. It will, of course, be understood that the openings 106 need not be very large in order to pass sufficient bonding liquid therethrough which will be spread upon the tape over a surface area of considerable width substantially as indicated in Fig. 13. If desired, a swab such as an elongated strip of a suitable porous material 109 such as glass fiber may be suitably secured to the end of the nozzle as shown in Fig. 12 for more evenly spreading upon the tape the bond-effecting liquid emerging from one or more holes 106 provided in the side wall of the nozzle.

In Fig. 14 is illustrated the pair of sheets 94 bonded together by means of the strip of binding tape 93 upon emerging from the machine described. In Fig. 15 are illustrated the same sheets 94 when spread out into the same plane.

In this modification, as in the case of those previously described, and in which the nozzle 96 is connected to the flexible conductor 21, upon initiation of operation of the machine a pressure pulse is applied to the liquid contained within the nozzle 96 to initiate flow of the bond-effecting liquid through the small openings 106 which occurs in this instance simultaneously with movement of the nozzle into engagement with the tape. Upon stopping of the machine, suction is also applied to the nozzle 96 to suck up into the nozzle the bond-effecting liquid adjacent the openings 106 and, as a further precaution, the nozzle 96 is actuated to the position illustrated in dotted lines 102 upon de-energization of the electromagnetic operating device 105.

While certain preferred embodiments of the invention have been described, changes and variations will be suggested to those skilled in the art, and it is intended to cover all such modifications within the scope of the appended claims.

I claim:

1. A machine for bonding together two pieces of plastic material, comprising a reservoir for a bond-effecting liquid, means for overlapping portions of said pieces of plastic, conduit means connected to said reservoir for conducting liquid between said overlapped portions, valve means in said conduit means for controlling the rate of liquid flow therethrough, said conduit means having an outlet adapted for extending between the overlapping pieces of plastic, suction means connected to said conduit means for creating a suction at said outlet, and control means connected to said suction means for effecting operation thereof upon stopping of said machine.

2. In a machine for bonding together overlapped sheets of plastic material, a reservoir for a bond-effecting liquid, a liquid delivery system connected to said reservoir and including a nozzle for feeding liquid between the overlapped sheets, and means connected to an intermediate portion of said system operable for withdrawing liquid therefrom at preselected times whereby the liquid flow through said nozzle will be reversed by the suction caused by said withdrawal.

3. In a machine for bonding together overlapped sheets of plastic material, a reservoir for a bond-effecting liquid, a liquid delivery system connected to said reservoir including a nozzle for feeding said liquid between the overlapped sheets, pressure pulse generating means connected to said system, and means for operating said pulse generating means at preselected times to cause flow of said liquid from said nozzle.

4. In a machine for bonding together overlapped sheets of plastic material, a reservoir for a bond-effecting liquid, a nozzle for feeding said liquid between the overlapped sheets, conduit means connecting said reservoir to said nozzle, and a pressure device operatively connected to said conduit means for causing an increase in pressure therein at preselected times and creating suction therein at other preselected times, and operating means connected to said pressure device for operating the same at said times.

5. In a machine of the class described, a reservoir for a bond-effecting liquid, a nozzle, a conduit connecting said reservoir to said nozzle, and a bellows connected to said conduit and adapted to withdraw a supply of liquid therefrom upon expansion thereof and to add said supply of liquid to said conduit upon subsequent contraction thereof.

6. In a machine for uniting overlapped sheets of plastic material, a reservoir for a bond-effecting liquid, a nozzle for feeding said liquid between the overlapped sheets, conduit means connecting said reservoir to said nozzle, a control valve in said conduit means for controlling the flow of liquid therethrough, bellows means connected to said conduit means between said valve and said nozzle for causing an increase in pressure upon the liquid in said conduit means at preselected times and for causing a decrease in such pressure at other preselected times, and control means operatively connected to said valve and said bellows means for effecting increase in pressure upon opening of said valve and for effecting decrease of pressure upon closure of said valve.

7. A machine for bonding together two sheets of plastic material, comprising a reservoir for a bond-effecting liquid, a conduit connected at one end to the reservoir for conducting liquid therefrom, a solenoid operated control valve in said conduit, a throttling valve in said conduit for permitting a predetermined rate of liquid flow therethrough, a nozzle connected to the other end of said conduit, a solenoid operated bellows arrangement connected to said conduit intermediate said nozzle and said throttling valve whereby the pressure in said conduit system may be increased or decreased, guide means for guiding said sheets of plastic into overlapping relationship adjacent said nozzle whereby liquid is delivered between said plastic sheets, a pair of vertically disposed rollers adjacent said guide means for pressing the overlapped portions of the plastic together immediately after said delivery of liquid, drive means operatively connected to said rollers for driving the same, and control means operatively connected to said control valve, bellows arrangement and said drive means for coordinating the action of the same.

8. A machine for uniting overlapped sheets of plastic material, comprising a reservoir for a bond-effecting liquid, a nozzle for feeding said liquid between the overlapped sheets, a conduit connecting said reservoir to said nozzle, a control valve in said conduit for controlling the flow of liquid therethrough, a bellows means connected to said conduit between said valve and said nozzle, a pair of feed rolls adapted to apply pressure to the overlapped portions of said sheets after placement of said liquid therebetween and to effect movement of said sheets through said machine, drive means operatively connected to said rolls for driving the same, and control means interconnecting said drive means, valve and bellows means operable to effect simultaneous starting of said drive means, opening of said valve, and operation of said bellows means to cause increase of liquid pressure in said conduit, and operable to effect simultaneous stopping of said drive means, closing of said valve and operation of said bellows means to cause decrease in liquid pressure in said conduit.

9. In a machine for bonding together two pieces of plastic material, a reservoir for a bond-effecting liquid, a guide element for overlapping portions of said pieces of plastic, a nozzle mounted in said element and extending between the overlapped pieces of plastic, a conduit connecting said reservoir to said nozzle, a throttling valve in said conduit for controlling the flow of liquid therethrough to a given rate, suction means connected to said conduit and operable to stop the flow of liquid through said nozzle, and pressure rollers adjacent said guide element for pressing together said overlapped pieces of plastic.

10. In a machine for uniting plastic sheets by placing a bond-effecting liquid between overlapped portions of said sheets, a guide element for guiding edge portions of a pair of plastic sheets into overlapping relation as said sheets pass through said machine, said guide element having a pair of vertically spaced apart, horizontally diposed, longitudinally extending grooves therein, said grooves extending inwardly one from each of the opposite side edges of said element and adapted to receive the edge portions of said sheets one in each, said element having a longitudinally extending bore therethrough adapted to receive a solvent feeding nozzle therewithin and with the discharge end of said nozzle disposed between the overlapped portions of said sheets as they emerge from said guide element, and means to releasably secure said nozzle in said element.

11. A guide element for use with apparatus of the class described in uniting together in overlapping relation a plurality of thin plastic sheets, said element comprising a generally rectangular member having a plurality of vertically spaced apart, longitudinally extending, horizontally disposed grooves adapted to receive the edge portions of said sheets one in each, and to guide the same into overlapping relation, said element having a plurality of vertically spaced apart, longitudinally extending openings therethrough adapted to receive a plurality of liquid feed nozzles one in each, said openings being spaced one between each pair of vertically spaced apart grooves and adapted to support a nozzle with the delivery end thereof between the overlapped portions of the sheets emerging from the corresponding pair of grooves.

12. In a machine for bonding together two pieces of plastic material, a reservoir for a bond-effecting liquid, a guide element for overlapping portions of said pieces of plastic, a nozzle for extending between the overlapped pieces of plastic, a conduit connecting said reservoir to said nozzle, suction means connected to said conduit and operable to stop the flow of liquid to said nozzle, and pressure means for pressing together said overlapped pieces of plastic.

JOHN M. TORR.

References Cited in the file of this patent

UNITED STATES PATENTS

| Number | Name | Date |
|---|---|---|
| 1,193,192 | Rose | Aug. 1, 1916 |
| 2,343,975 | Hosfield | Mar. 14, 1944 |